(12) United States Patent
Lee et al.

(10) Patent No.: US 10,020,917 B2
(45) Date of Patent: Jul. 10, 2018

(54) METHOD FOR HANDLING OF DRX TIMERS FOR MULTIPLE REPETITION TRANSMISSION IN WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 15/333,782

(22) Filed: Oct. 25, 2016

(65) Prior Publication Data
US 2017/0134124 A1 May 11, 2017

Related U.S. Application Data

(60) Provisional application No. 62/251,706, filed on Nov. 6, 2015.

(51) Int. Cl.
| | |
|---|---|
| *H04W 4/00* | (2018.01) |
| *H04L 1/18* | (2006.01) |
| *H04W 76/28* | (2018.01) |
| *H04L 12/26* | (2006.01) |
| *H04W 72/04* | (2009.01) |
| *H04W 76/04* | (2009.01) |

(52) U.S. Cl.
CPC ........ *H04L 1/1812* (2013.01); *H04L 43/0864* (2013.01); *H04W 72/042* (2013.01); *H04W 76/048* (2013.01); *H04W 76/28* (2018.02)

(58) Field of Classification Search
CPC ............ H04L 1/1812; H04L 43/0864; H04W 76/048; H04W 72/042
See application file for complete search history.

(56) References Cited

U.S. PATENT DOCUMENTS

| | | | | |
|---|---|---|---|---|
| 2011/0243048 | A1* | 10/2011 | Wang | H04L 5/0051 370/311 |
| 2015/0085712 | A1* | 3/2015 | Wang | H04W 76/048 370/280 |
| 2016/0128129 | A1* | 5/2016 | Kahtava | H04L 1/00 370/311 |
| 2016/0143086 | A1* | 5/2016 | Kahtava | H04L 1/00 370/311 |

* cited by examiner

*Primary Examiner* — Afshawn M Towfighi
(74) *Attorney, Agent, or Firm* — Lee Hong Degerman Kang Waimey

(57) ABSTRACT

The present invention relates to a wireless communication system. More specifically, the present invention relates to a method and a device for handling of DRX timers for multiple repetition transmission in wireless communication system, the method comprising: monitoring a Physical Downlink Control Channel (PDCCH) during an active time when Discontinuous Reception (DRX) is configured; receiving multiple repetitions of a PDCCH in a first plurality of subframes; receiving multiple repetitions of Physical Downlink Shared Channel (PDSCH) corresponding to the PDCCH in a second plurality of subframes; starting a Hybrid ARQ (HARQ) Round Trip Time (RTT) Timer in a subframe containing a last repetition of the multiple repetitions of the PDSCH.

8 Claims, 11 Drawing Sheets

(a) Control-Plane Protocol Stack (b) User-Plane Protocol Stack

METHOD FOR HANDLING OF DRX TIMERS FOR MULTIPLE REPETITION TRANSMISSION IN WIRELESS COMMUNICATION SYSTEM AND A DEVICE THEREFOR

Pursuant to 35 U.S.C. § 119(e), this application claims the benefit of U.S. Provisional Patent Application No. 62/251, 706, filed on Nov. 6 2015, the contents of which are hereby incorporated by reference herein in its entirety.

BACKGROUND OF THE INVENTION

Field of the Invention

The present invention relates to a wireless communication system and, more particularly, to a method for handling of DRX timers for multiple repetition transmission in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
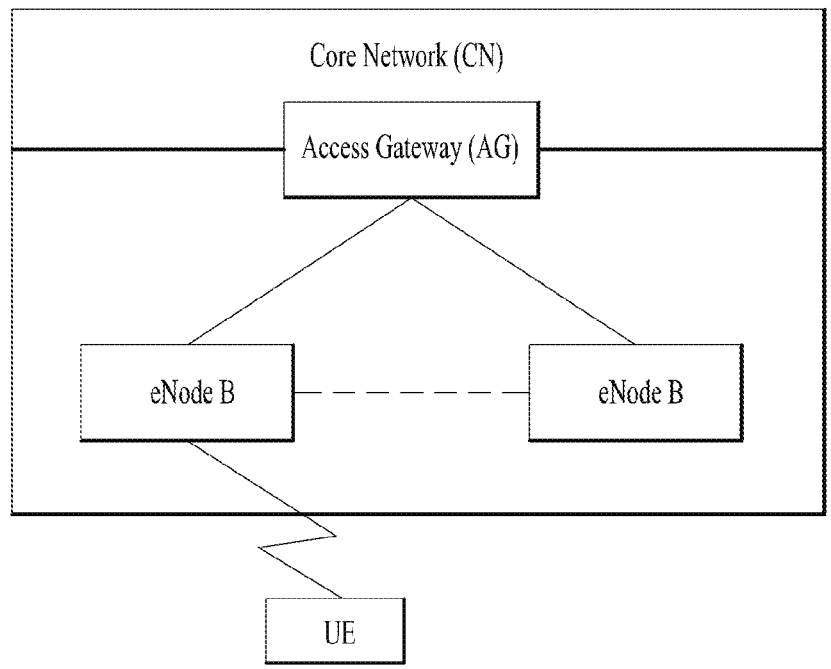
FIG. 1 is a diagram showing a network structure of an Evolved Universal Mobile Telecommunications System (E-UMTS) as an example of a wireless communication system.
Figure 2A:
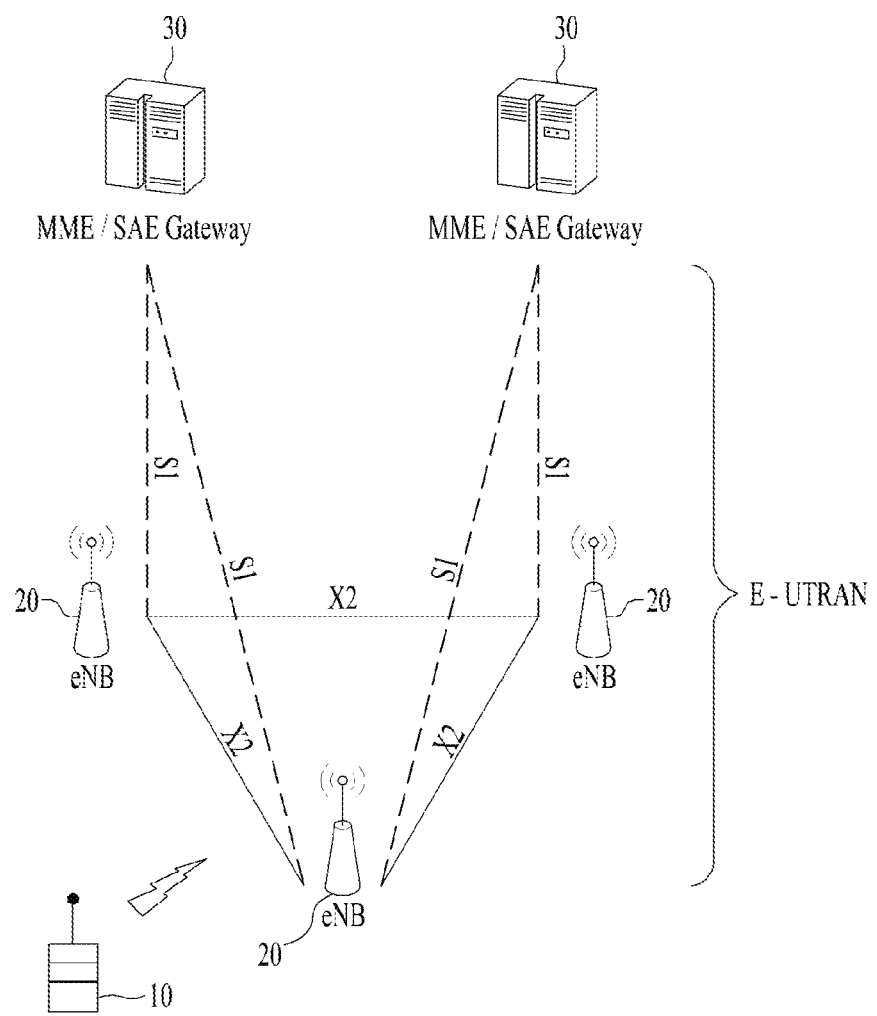
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
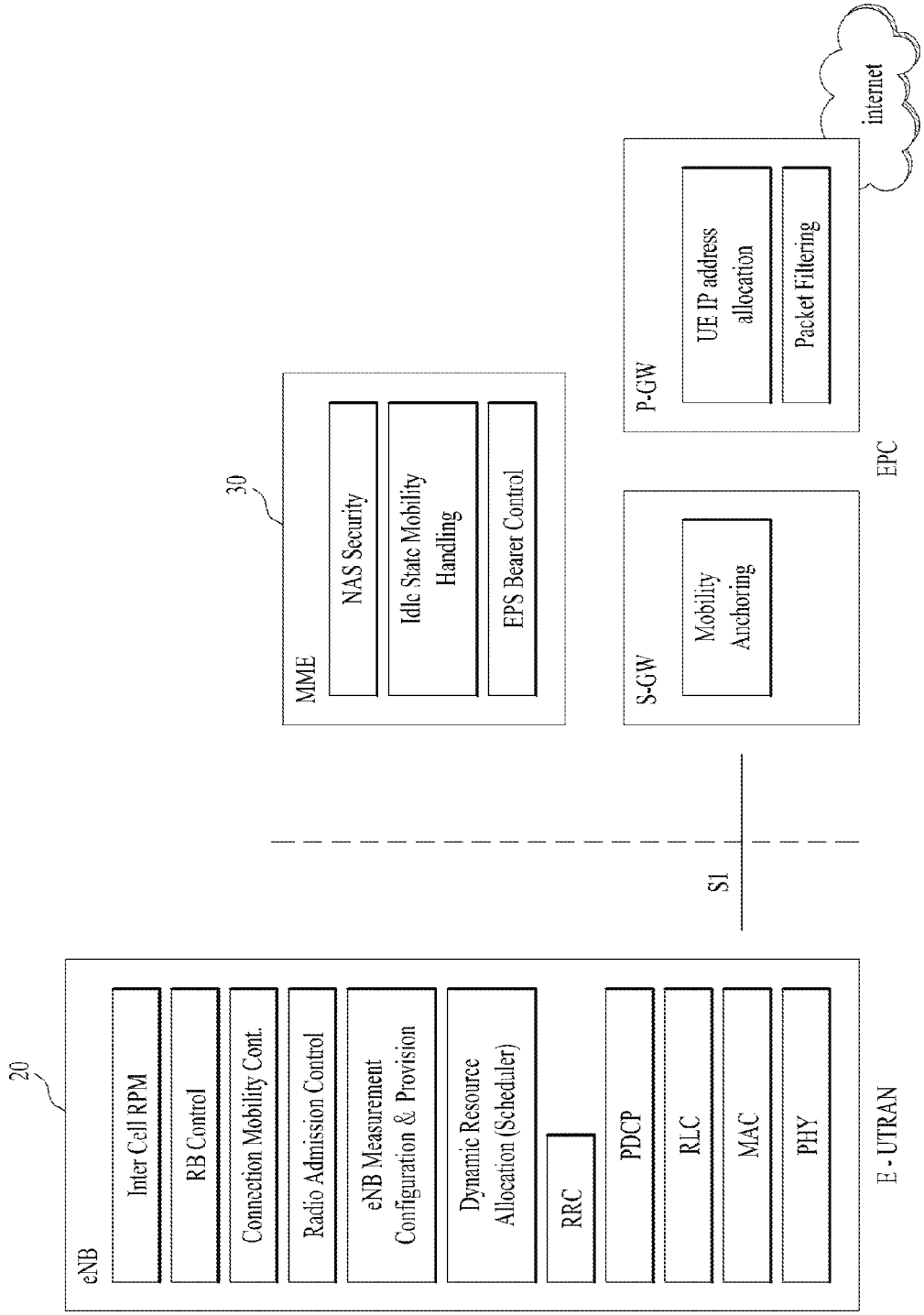
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
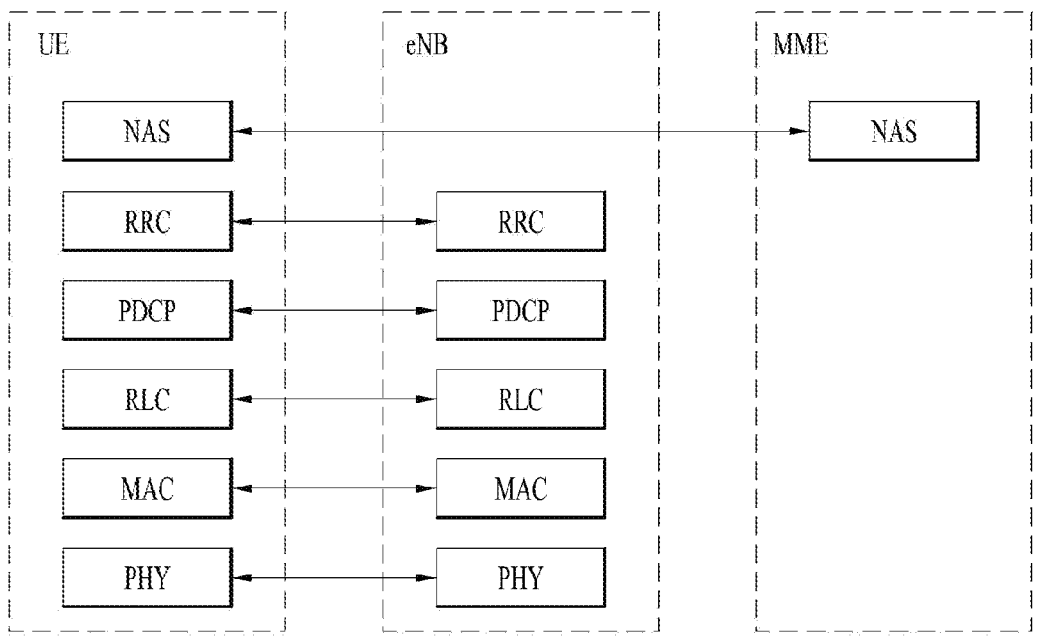
FIG. 3 is a diagram showing a control plane and a user plane of a radio interface protocol between a UE and an E-UTRAN based on a 3rd generation partnership project (3GPP) radio access network standard.
Figure 3:
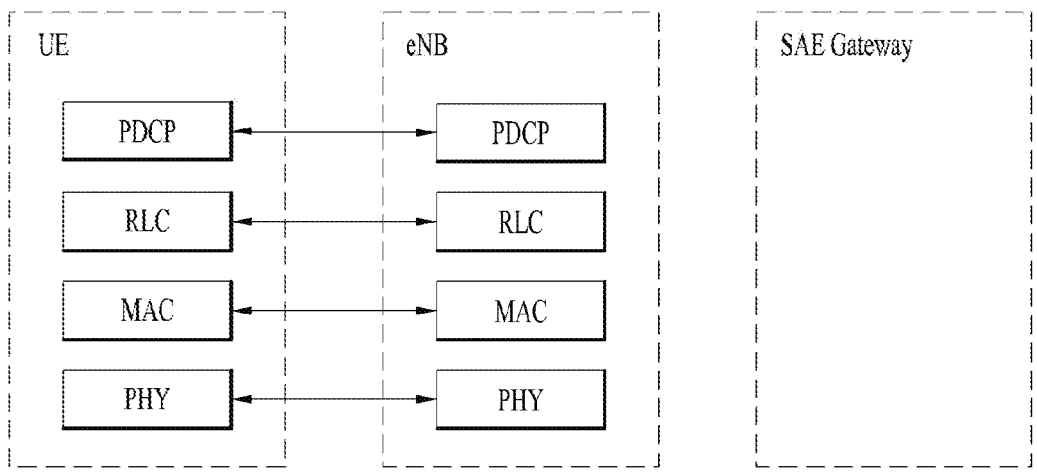

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
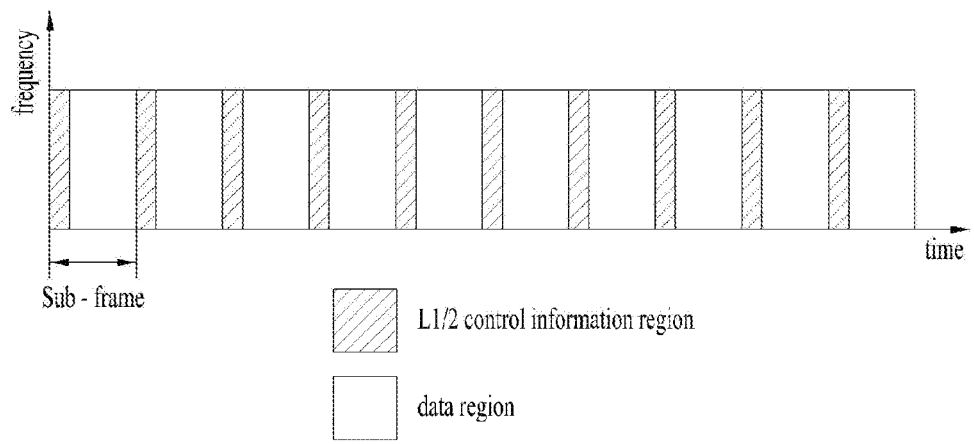
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots.

The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
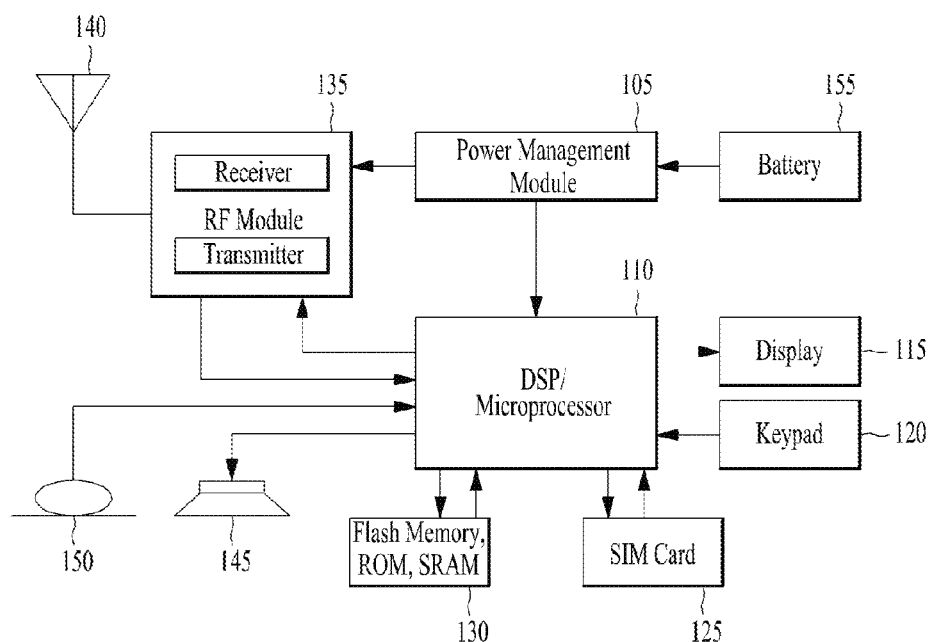
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6A:
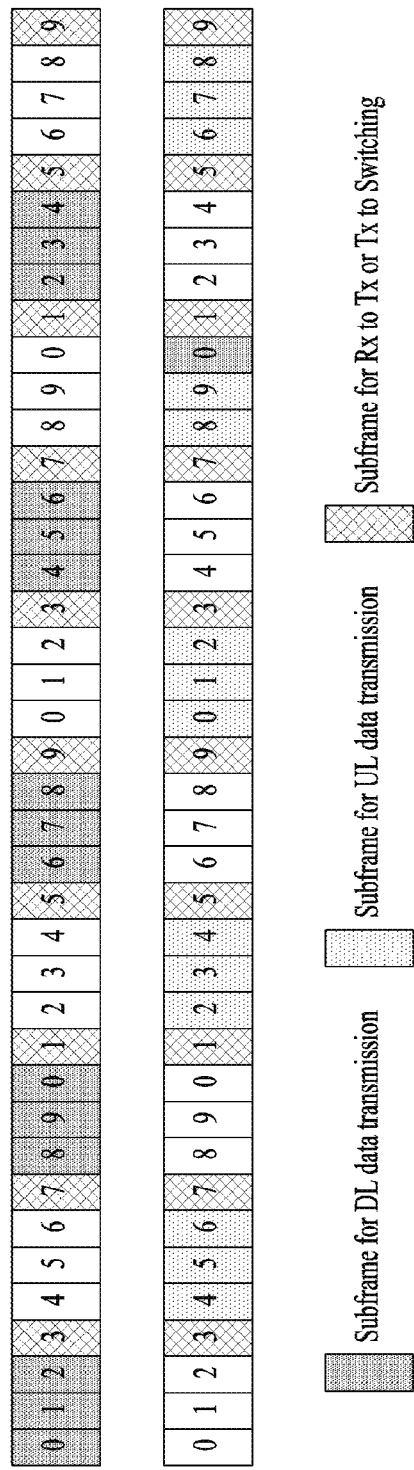
FIG. 6A is an example for data transmission and reception for a Category 0 low complexity UE.
Figure 6B:
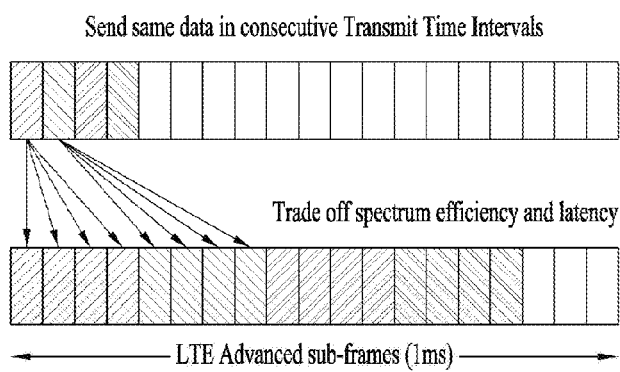
FIG. 6B is an example for repetitions for data transmission for a Category 0 low complexity UE.

FIG. 6A is an example for data transmission and reception for a Category 0 low complexity UE, and FIG. 6B is an example for repetitions for data transmission for a Category 0 low complexity UE.

Such a communication technology as MTC is specialized from 3GPP to transmit and receive IoT-based information and the MTC has a difference according to each release of the technology. Release 10 and Release 11 are focusing on a method of controlling loads of IoT (M2M) products and a method of making the loads have least influence on a network when the IoT products make a request for accessing an eNB at the same time. Release 12 and Release 13 are focusing on a low-cost technology enabling a battery to be simply implemented and very little used by reducing complicated functions mounted on a legacy smartphone as many as possible.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

In particular, a low complexity UE does not require such a function of high performance as a function of a smartphone and an amount of data used by the low complexity UE is not that big in general. Hence, there is no reason for a complicated and high-price communication module to come to the market for such a UE as the low complexity UE.

In order to manufacture a low-cost IoT (M2M) device, a concept such as UE Category 0 has been introduced. A UE category corresponds to a general figure used in 3GPP to indicate the amount of data capable of being processed by a UE in a communication modem. In general, as the amount of data to be processed is getting bigger, a price of a modem is also increasing due to a memory or performance enhancement. In case of a currently commercialized smartphone, performance of the smartphone is continuously increasing from 100 Mbps to 150 Mbps and 300 Mbps on the basis of download.

Table 1 shows UE categories used in 3GPP.

TABLE 1

| UE Category | Downlink (velocity) | Uplink (velocity) |
| --- | --- | --- |
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbp |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signalling has been extended to include the UE Radio Capability for paging. This paging specific capability information is provided by the eNB to the MME, and the MME uses this information to indicate to the eNB that the paging request from the MME concerns a low complexity UE.

And, since it is able to perform transmission and reception on specific time only without performing transmission and reception at the same time like FIG. 6A, it may be able to perform an operation of TDD in FDD (since transmission and reception are not performed at the same time). Additionally, unlike legacy TDD, since it is able to provide sufficient switching time as much as 1 ms to a section at which switching is performed between transmission and reception, it is able to expect a revolutionary cost reduction effect in terms of overall hardware part especially a modem and an RF. On the contrary, according to a regulation of a legacy LTE UE, it is mandatory to use at least 2 or more reception antennas.

First, a bandwidth reduced low complexity (BL) UE can operate in any LTE system bandwidth but with a limited channel bandwidth of 6 PRBs (corresponding to the maximum channel bandwidth available in a 1.4 MHz LTE system) in downlink and uplink.

A BL UE may access a cell only if the MIB of the cell indicates that scheduling information for SIB1 specific for BL UEs is scheduled. If not, the UE considers the cell as barred.

A BL UE receives a separate occurrence of system information blocks (sent using different time/frequency resources). A BL UE has a transport block size (TBS) limited to 1000 bit for broadcast and unicast. The BL UE determines the scheduling information for SIB1 specific for BL UEs based on information in MIB. Scheduling information for other SIBs is given in SIB1 specific for BL UEs. The BCCH modification period for BL UEs is a multiple of the BCCH modification period provided in SIB2. The SIB transmission occasions within an SI-window are provided in the SIB1 specific for BL UEs. A BL UE can acquire SI messages across SI windows. The maximum number of SI messages that can be acquired across SI windows is 4. A BL UE is not required to detect SIB change when in RRC_CONNECTED.

A BL UE is paged based on paging occasions in time domain, and paging narrowbands in frequency domain. The starting subframe of a paging occasion is determined in the same way as the paging occasion in the legacy paging mechanism.

A set of PRACH resources (e.g. time, frequency, preamble), each associated with BL UEs in normal coverage, is provided in SIB. Number of PRACH repetitions and number of maximum preamble transmission attempts for BL UEs in normal coverage are provided in SIB. Time/frequency resources and repetition factor for random access response messages for BL UEs are derived from the used PRACH resources.

Next, a UE in enhanced coverage is a UE that requires the use of enhanced coverage functionality to access the cell. In this release of specification two enhanced coverage modes (mode A, mode B) are supported. The support of enhanced coverage mode A is mandatory for a BL UE.

A UE may access a cell using enhanced coverage functionality only if the MIB of the cell indicates that scheduling information for SIB1 specific for BL UEs is scheduled. System information procedures for UEs in enhanced coverage are identical to the system information procedures for bandwidth reduced low complexity UEs. A UE capable of enhanced coverage acquires, if needed, and uses legacy system information when in normal coverage if it is not a BL UE. A UE capable of enhanced coverage acquires, if needed, and uses system information specific for UEs in enhanced coverage. A UE in enhanced coverage is not required to detect SIB change when in RRC_CONNECTED.

A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs in same enhanced coverage level use random access resources associated with the same enhanced coverage level. Time/frequency resources and repetition factor for random access response messages for UEs in enhanced coverage are derived from the used PRACH resources.

A UE in enhanced coverage is paged using the same mechanism for paging BL UEs. The starting subframe of a paging occasion and the repetition pattern (in both time and frequency domain for downlink common control signaling) of that paging occasion are determined irrespective of the UEs enhanced coverage level.

The paging request from the MME for a UE supporting enhanced coverage functionality may contain enhanced coverage level related information and corresponding cell ID.

A UE in RRC_IDLE does not inform the network when it changes the enhanced coverage level.

A UE in enhanced coverage camps on a suitable cell where S criterion for UEs in enhanced coverage is fullfiled. The UE shall re-select to inter-frequency cells in which it is able to operate in normal coverage over cells in which it has to be in enhanced coverage.

Connected mode mobility mechanisms such as measurement reporting, network controlled handover etc., are supported for UEs in enhanced coverage. No additional mechanisms are introduced to support the use of enhanced coverage functionality to access an E-UTRA cell during inter-RAT handovers.

In particular, discussion on a solution for a performance deterioration problem caused by decrease of output power is in progress by considering a scheme of performing repetitive transmission as shown in FIB. 6B or a TTI bundling technology previously used in VoLTE (Voice of LTE, LTE voice call service). Consequently, it might say that it is able to develop a communication module of low complexity through the low-cost IoT (M2M) technology explained in the Release 12 and the low-power IoT (M2M) technology to which the Release 13 is targeting.

Figure 7:
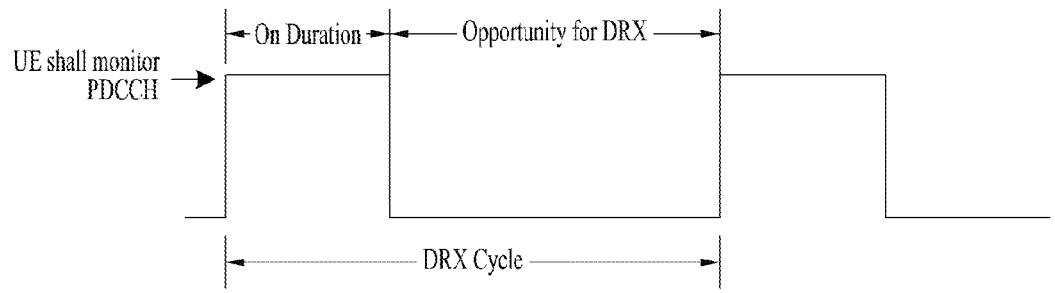
FIG. 7 is a diagram showing a concept of DRX (Discontinuous Reception).

FIG. 7 is a diagram showing a concept of DRX (Discontinuous Reception).

Referring to FIG. 7, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 8:
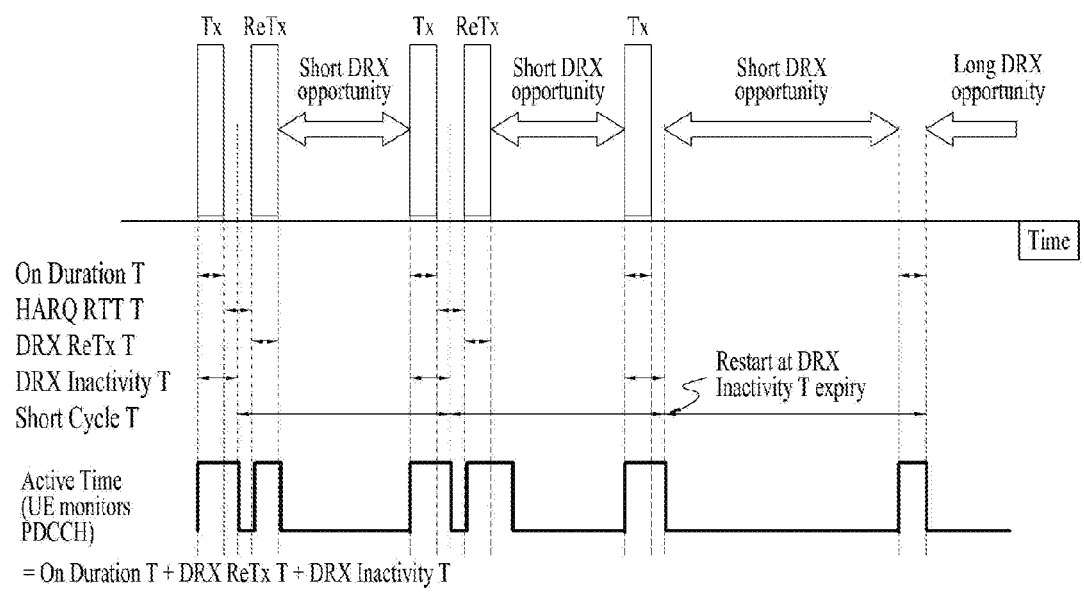
FIG. 8 is a diagram showing a method for a DRX operation in the LTE system.

FIG. 8 is a diagram showing a method for a DRX operation in the LTE system.

Referring to FIG. 8, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

Figure 9A:
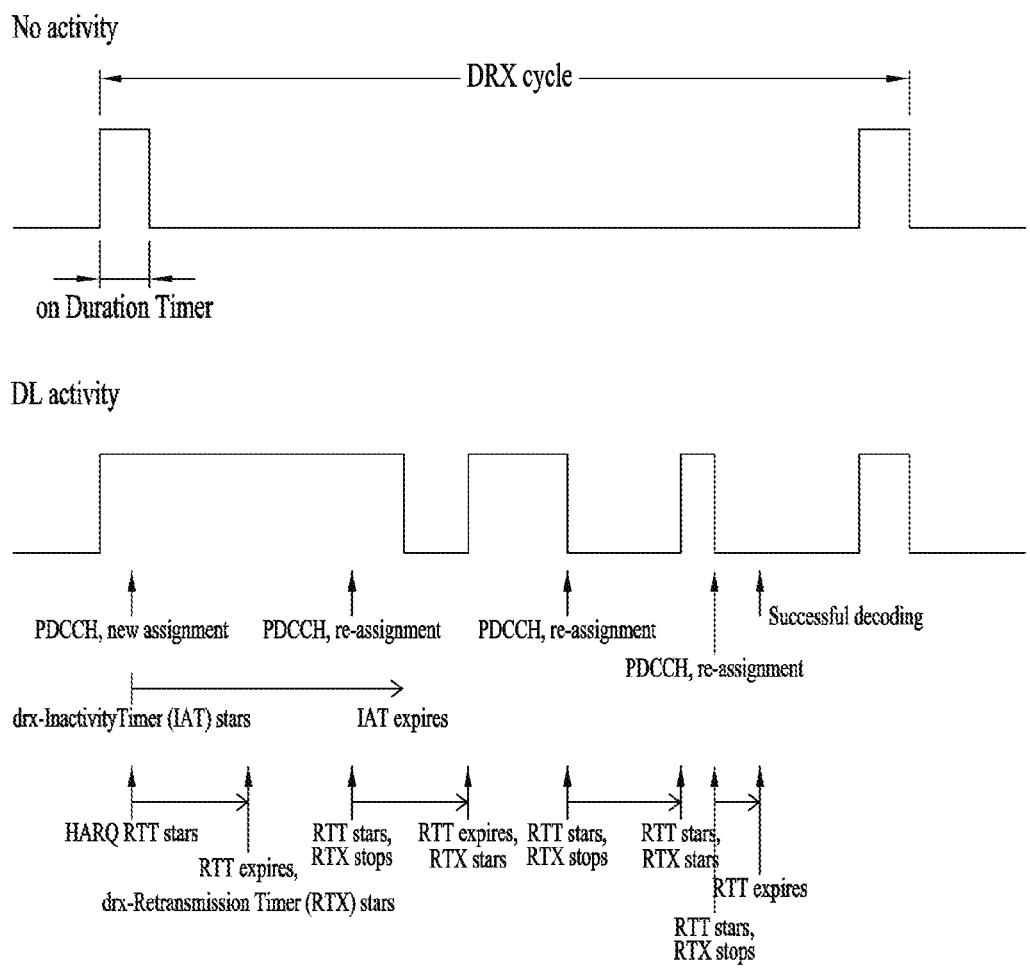
FIG. 9A is an example for a legacy Discontinuous Reception (DRX) operation, FIG. 9B an example for a Rel-13 operation for no activity.
Figure 9B:
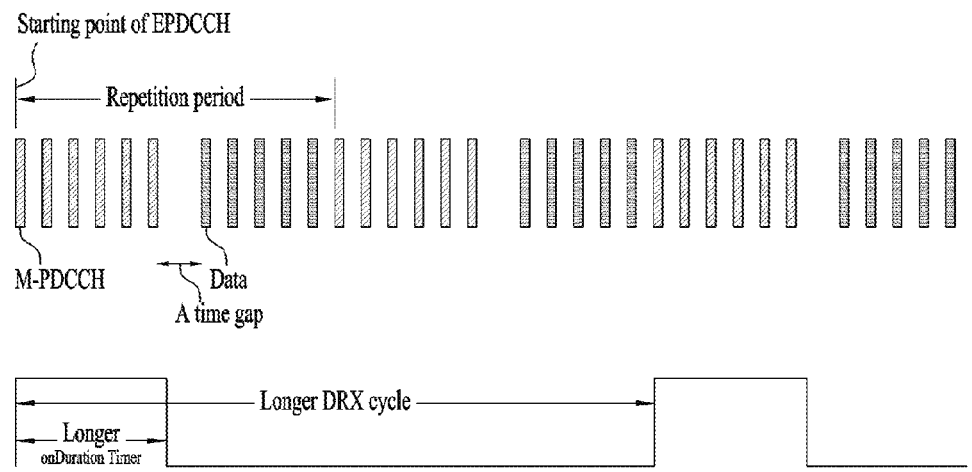

FIG. 9A is an example for a legacy Discontinuous Reception (DRX) operation, and FIG. 9B an example for a Rel-13 operation for no activity.

For power saving purpose, DRX operation has been applied since Rel-8. When in RRC_CONNECTED, UE is allowed to monitor the PDCCH discontinuously using the DRX operation, which is specified with several timers and parameters such as onDurationTimer, drx-InactivityTimer, drx-RetransmissionTimer, longDRX-Cycle, drxStartOffset, drxShortCycleTimer, shortDRX-Cycle and HARQ RTT timer.

FIG. 9A is the general operation of the DRX. In DRX operation, the Active Time is regarded as the time while onDurationTimer, drx-InactivityTimer or drx-RetransmissionTimer is running. Also, there are other cases on the Active Time, as above mentioned. As new assignment over PDCCH is scheduled during onDurationTimer is running, both drx-InactivityTimer and a HARQ RTT timer start. As the HARQ RTT timer expires, drx-RetransmissionTimer then starts. If at least one of drx-InactivityTimer or drx-RetransmissionTimer is running, the UE has to monitor PDCCH. If PDCCH indicates the assignment, the HARQ RTT timer starts and drx-RetransmissionTimer stops. For the successful decoding, HARQ RTT timer stops.

Meanwhile, the concept of DRX would be still beneficial to Rel-13 low complexity MTC UE. We then have a question on whether to still re-use the legacy DRX operation. It is assumed that M-PDCCH (which might be also modified to efficiently support Rel-13 low complexity MTC) would be used instead of legacy PDCCH, and for coverage extension, the M-PDCCH and the data transmission will be repeated for soft combining. Rel-13 low complexity MTC UE would identify whether the M-PDCCH includes its assignment at the end of repetitions of the M-PDCCH. It means that onDurationTimer has to be set to cover at least the repetitions of the M-PDCCH as shown in FIG. 9B. In current specification, the range of onDurationTimer is from 1 to 200 PDCCH subframes (for FDD, 1~200 ms). It is FFS how many to repeat M-PDCCH for coverage extension. According to RAN1 agreement, there is a gap between the end of M-PDCCH repetitions and the starting point of data transmission. According to this agreement, the DRX operation can be configured even for Rel-13 low complexity MTC UE, and the configured value of onDurationTimer ensures that the coverage-extended MTC UE can receive all repetitions of the M-PDCCH.

In addition, it has to be investigated further if the current range of DRX cycle is sufficient for the coverage-extended MTC UE.

Also, a discussion on the starting point of the timers related to DRX is needed. In current specification, the drx-InactivityTimer (re)starts whenever PDCCH indicates a new transmission. In Rel-13 low complexity MTC, the MTC UE would identify if PDDCH indicates a new transmission for the MTC UE at the end of the repetitions of M-PDCCH. As the UE can receive multiple M-PDCCH and multiple PDSCH within one repetition period, a new mechanism is needed for DRX related timers in order to guarantee enough time duration for M-PDCCH or PDSCH reception.

Figure 10:
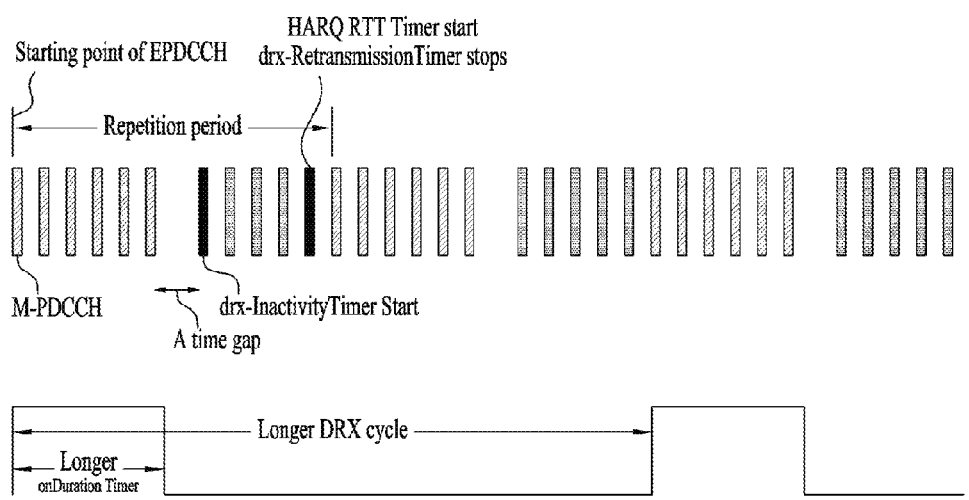
FIG. 10 is a conceptual diagram for handling of DRX timers for multiple repetition transmission in wireless communication system according to embodiments of the present invention.

FIG. 10 is a conceptual diagram for handling of DRX timers for multiple repetition transmission in wireless communication system according to embodiments of the present invention.

If the UE is configured to transmit multiple times for coverage enhancement or the UE is a low-cost UE, the UE shall operate drx-InactivityTimer, HARQ RTT Timer, and drx-RetransmissionTimer as follows.

First, in case of a drx_inactivity timer, the UE shall start drx-InactivityTimer at the first subframe of PDSCH for downlink transmission or the first subframe of PUSCH for uplink transmission which is indicated by M-PDCCH. The drx-InactivityTimer specifies the number of consecutive PDCCH-subframe(s) after the subframe in which a PDCCH indicates the first transmission of an initial UL, DL user data transmission for this MAC entity.

Second, in case of a HARQ RTT timer, the UE shall start HARQ RTT Timer at the last subframe of PDSCH transmission which is indicated by M-PDCCH, or the UE shall start HARQ RTT Timer at the next subframe of the last subframe of PDSCH transmission which is indicated by M-PDCCH. The HARQ RTT Timer specifies the minimum amount of subframe(s) before a PDCCH for DL HARQ retransmission is expected by the MAC entity.

Lastly, in case of drx-retransmission timer, the UE shall stop drx-RetransmissionTimer at the last subframe of PDSCH transmission which is indicated by M-PDCCH, or UE shall stop drx-RetransmissionTimer at the next subframe of the last subframe of PDSCH transmission which is indicated by M-PDCCH. The drx-RetransmissionTimer specifies the maximum number of consecutive PDCCH-subframe(s) until a DL retransmission is received.

Preferably, PDCCH refers PDCCH, M-PDCCH, or E-PDCCH.

Regarding FIG. 10, when the UE receives a M-PDCCH in a subframe in which a repetition period starts, the UE starts a drx-inactivity timer in a first subframe of PDSCH repetitions, and the UE starts a HARQ-RTT timer and stops a drx-retransmission timer in a last subframe of the PDSCH repetitions.

Preferably, the repetition period (=one attempt) is composed of multiple repetition of PDCCH and multiple repetition of data on PDSCH/PUSCH which are indicated by the multiple repetition of PDCCH. The subframes for multiple repetition of PDSCH or PUSCH are indicated by PDCCH within the same attempt.

Figure 11:
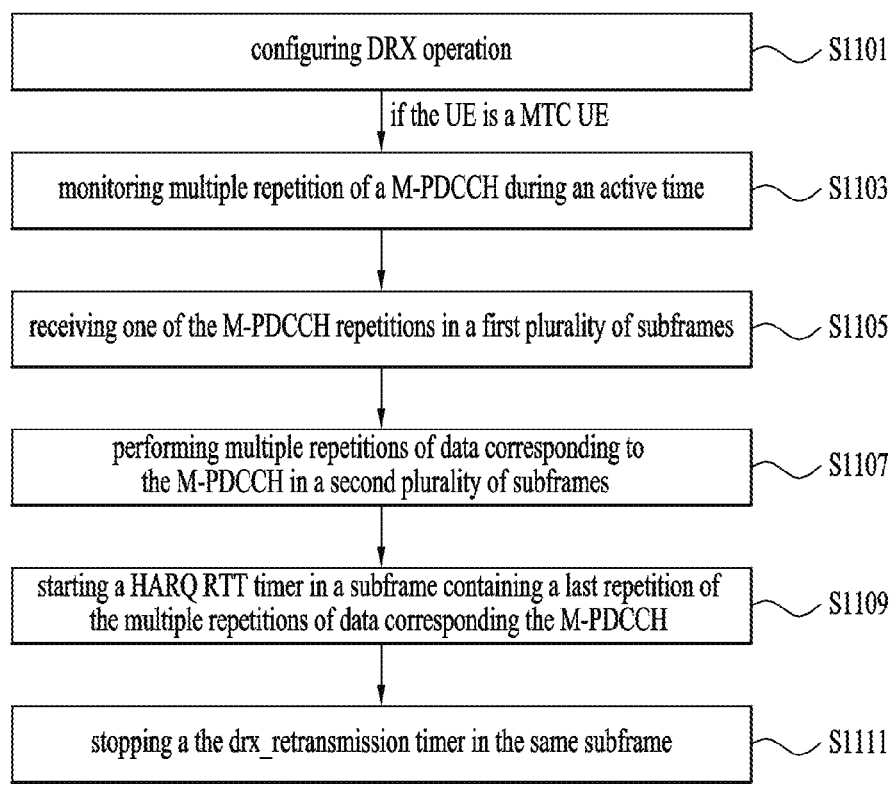
FIG. 11 is a conceptual diagram for handling of HARQ RTT timer for multiple repetition transmission in wireless communication system according to embodiments of the present invention.

FIG. 11 is a conceptual diagram for handling of HARQ RTT timer for multiple repetition transmission in wireless communication system according to embodiments of the present invention.

If the UE is a MTC UE (e.g, NB-IoT UEs, BL UEs or UEs in enhanced coverage), the UE is configured to monitor multiple repetition of a M-PDCCH during an active time (S1003) When the DRX is configured (S1101).

When the UE receives one of the M-PDCCH repetitions in a first plurality of subframes (S1105), the UE can transmit or receive multiple repetitions of data corresponding to the M-PDCCH in a second plurality of subframes (S1107).

Preferably, the data corresponding to the M-PDCCH can be transmitted from a PDSCH or PUSCH.

At this time, the UE can start a HARQ RTT timer in a subframe containing a last repetition of the multiple repetitions of data corresponding the M-PDCCH (S1109).

After transmitting the multiple repetitions of data or receiving multiple repetitions of data, the UE receives an ACK or NACK signal for the transmitting the multiple repetitions of data or, transmits an ACK or NACK signal for receiving multiple repetitions of data.

Preferably, the HARQ RTT Timer is for a HARQ process corresponding to the M-PDCCH.

Preferably, a repetition period of the UE includes a number of the multiple repetitions of a PDCCH and a number of the multiple repetitions of a PDSCH.

If the data of the corresponding HARQ process was not successfully decoded when the HARQ RTT Timer expires, the UE starts the drx-RetransmissionTimer for the corresponding HARQ process.

In additionally, when the UE starts the HARQ RTT timer in the subframe containing a last repetition of the multiple repetitions of data corresponding the M-PDCCH, the UE can stop the drx_retransmission timer in the same subframe (S1111).

In conclusion, for the starting point of the HARQ RTT timer, it seems slightly controversial. One approach is to also start the HARQ RTT timer at the end of repetitions of M-PDCCH. Depending on the starting point, the range of HARQ RTT timer needs to be re-defined. The legacy HARQ RTT timer is fixed, i.e. for FDD, set to 8 subframes and for TDD, set to k=4 subframes, where k is the interval between the downlink transmission and the transmission of associated HARQ feedback. However, if the HARQ RTT timer starts at the end of M-PDCCH repetition, it may have such a UE complexity problem as a HARQ RTT timer value, which is changing in consideration of the repetition count of PDSCH whenever scheduling is performed. Whereas, if the HARQ RTT timer starts at the end of repetitions of data transmissions according to our invention, it is able to configure the HARQ RTT timer without considering the repetition count of the PDSCH. According to RAN1 agreement, the consequential data transmission starts to be transmitted after k subframe from the end of repetitions of M-PDCCH. As the HARQ RTT timer expires, the drx-Retransmission-Timer starts. The configured value of drx-Retransmission-Timer has to also guarantee to cover the repetitions of the M-PDCCH.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the scope of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for a User Equipment (UE) operating in a wireless communication system, the method comprising:
   monitoring a Physical Downlink Control Channel (PDCCH) during a first active time when Discontinuous Reception (DRX) is configured;
   during the monitoring, receiving multiple repetitions of a PDCCH in a first plurality of subframes;
   receiving multiple repetitions of Physical Downlink Shared Channel (PDSCH) corresponding to the PDCCH in a second plurality of subframes;
   transmitting a single NACK in response to the multiple repetitions of PDSCH; and
   starting a Hybrid ARQ (HARQ) Round Trip Time (RTT) Timer in a subframe containing a last repetition of the multiple repetitions of the PDSCH,
   wherein the HARQ RTT Timer specifies a minimum amount of subframes before a PDCCH for a downlink HARQ retransmission is expected by the UE in response to the transmitted single NACK.

2. The method according to claim 1, further comprising:
   if the PDCCH for the downlink HARQ retransmission is received before the HARQ RTT Timer expires, receiving a PDSCH corresponding to the PDCCH for the downlink HARQ retransmission.

3. The method according to claim 1, further comprising:
   if the PDCCH for downlink HARQ retransmission is not received before the timer expires, monitoring the PDCCH during a second active time when the Discontinuous Reception (DRX) is configured.

4. The method according to claim 1, further comprising:
   stopping a DRX_retransmission timer in the subframe containing the last repetition of the multiple repetitions of the PDSCH, the DRX_retransmission timer corresponding to the first active time when the DRX is configured.

5. A User Equipment (UE) for operating in a wireless communication system, the UE comprising:
   a Radio Frequency (RF) module; and a processor operably coupled with the RF module and configured to:
   monitor a Physical Downlink Control Channel (PDCCH) during a first active time when Discontinuous Reception (DRX) is configured,
   during the monitoring, receive multiple repetitions of a PDCCH in a first plurality of subframes,
   receive multiple repetitions of Physical Downlink Shared Channel (PDSCH) corresponding to the PDCCH in a second plurality of subframes,
   transmit a single NACK in response to the multiple repetitions of PDSCH, and
   start a Hybrid ARQ (HARD) Round Trip Time (RTT) Timer in a subframe containing a last repetition of the multiple repetitions of the PDSCH,
   wherein the HARQ RTT Timer specifies a minimum amount of subframes before a PDCCH for a downlink HARQ retransmission is expected by the UE in response to the transmitted single NACK.

6. The UE according to claim 5, wherein, if the PDCCH for the downlink HARQ retransmission is received before the HARQ RTT Timer expires, the processor is further configured to receive a PDSCH corresponding to the PDCCH for the downlink HARQ retransmission.

7. The UE according to claim 5, wherein, if the PDCCH for downlink HARQ retransmission is not received before the timer expires, the processor is further configured to monitor the PDCCH during a second active time when the Discontinuous Reception (DRX) is configured.

8. The UE according to claim 5, wherein the processor is further configured to:
   stop a DRX_retransmission timer in the subframe containing the last repetition of the multiple repetitions of the PDSCH, the DRX_retransmission timer corresponding to the first active time when the DRX is configured.

\* \* \* \* \*